United States Patent
Takahashi et al.

(10) Patent No.: US 8,263,287 B2
(45) Date of Patent: Sep. 11, 2012

(54) POLYMER ELECTROLYTE MEMBRANES COMPRISING ALKYL GRAFT CHAINS AND A PROCESS FOR PRODUCING THE SAME

(75) Inventors: Shuichi Takahashi, Takasaki (JP); Yasunari Maekawa, Takasaki (JP); Shin Hasegawa, Takasaki (JP)

(73) Assignee: Japan Atomic Energy Agency, Ibaraki (JP)

( * ) Notice: Subject to any disclaimer, the term of this patent is extended or adjusted under 35 U.S.C. 154(b) by 1252 days.

(21) Appl. No.: 12/068,665

(22) Filed: Feb. 8, 2008

(65) Prior Publication Data

US 2008/0199756 A1  Aug. 21, 2008

(30) Foreign Application Priority Data

Feb. 21, 2007 (JP) .................... 2007-40769

(51) Int. Cl.
 *H01M 8/10* (2006.01)
(52) U.S. Cl. ......... 429/493; 429/494; 429/492; 429/491
(58) Field of Classification Search .................... 429/493
 See application file for complete search history.

(56) References Cited

U.S. PATENT DOCUMENTS

| | | | |
|---|---|---|---|
| 4,157,432 A * | 6/1979 | Lundberg et al. | 525/344 |
| 5,817,718 A | 10/1998 | Nezu et al. | |
| 5,994,426 A * | 11/1999 | Nezu et al. | 522/125 |
| 6,242,123 B1 | 6/2001 | Nezu et al. | |
| 6,893,764 B2 | 5/2005 | Koyama et al. | |
| 2003/0118849 A1* | 6/2003 | Yamasaki et al. | 428/447 |
| 2005/0031930 A1* | 2/2005 | Koyama et al. | 429/33 |
| 2005/0164063 A1* | 7/2005 | Wariishi et al. | 429/33 |
| 2005/0282086 A1* | 12/2005 | Shimada et al. | 430/300 |
| 2006/0088750 A1* | 4/2006 | Nobuta et al. | 429/33 |
| 2006/0105216 A1* | 5/2006 | Nagai et al. | 429/33 |
| 2006/0251951 A1* | 11/2006 | Obata et al. | 429/42 |
| 2007/0142580 A1* | 6/2007 | Ino et al. | 526/240 |
| 2008/0171251 A1* | 7/2008 | Takagi et al. | 429/33 |
| 2009/0068534 A1* | 3/2009 | Chen et al. | 429/33 |
| 2009/0325027 A1* | 12/2009 | Maekawa et al. | 429/33 |
| 2010/0216901 A1* | 8/2010 | Maekawa et al. | 521/27 |

FOREIGN PATENT DOCUMENTS

JP  2005142014 A  *  6/2005

OTHER PUBLICATIONS

JP2005-142014A to Asado et al, English translation.*

* cited by examiner

*Primary Examiner* — Patrick Ryan
*Assistant Examiner* — Lucas O Donnell

(57) ABSTRACT

Polymer electrolyte membranes for use in fuel cells are produced by first graft polymerizing acrylic acid derivatives or vinylketone derivatives as monomers on polymer substrates and by then performing selective conversion to a sulfonic acid group of hydrogen atoms on the carbon atom adjacent to the carbonyl in the ketone or carboxyl group on the graft chains.

6 Claims, 1 Drawing Sheet

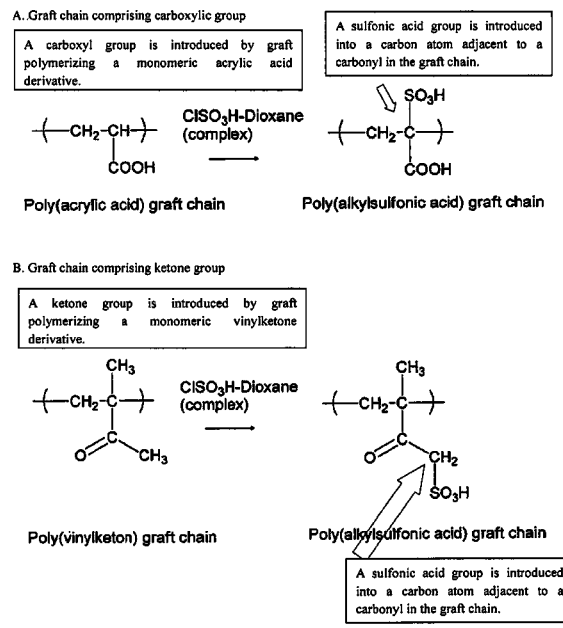

A. Graft chain comprising carboxylic group

| A carboxyl group is introduced by graft polymerizing a monomeric acrylic acid derivative. | | A sulfonic acid group is introduced into a carbon atom adjacent to a carbonyl in the graft chain. |
|---|---|---|

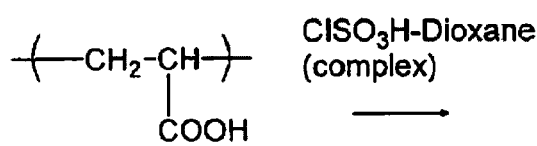   ClSO₃H-Dioxane (complex) →   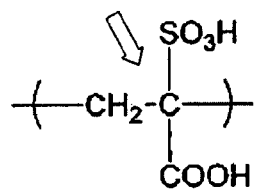

Poly(acrylic acid) graft chain            Poly(alkylsulfonic acid) graft chain

B. Graft chain comprising ketone group

| A ketone group is introduced by graft polymerizing a monomeric vinylketone derivative. |
|---|

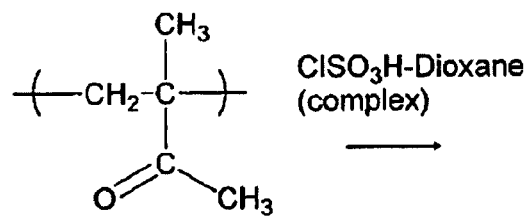   ClSO₃H-Dioxane (complex) →   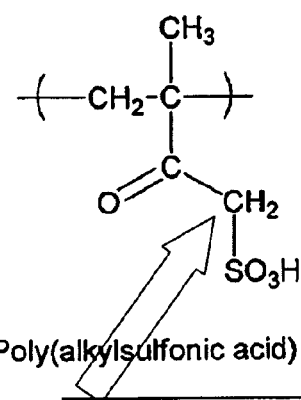

Poly(vinylketon) graft chain            Poly(alkylsulfonic acid) graft chain

| A sulfonic acid group is introduced into a carbon atom adjacent to a carbonyl in the graft chain. |
|---|

POLYMER ELECTROLYTE MEMBRANES COMPRISING ALKYL GRAFT CHAINS AND A PROCESS FOR PRODUCING THE SAME

BACKGROUND OF THE INVENTION

1. Technical Field

This invention relates to polymer electrolyte membranes having superior proton conductivity, oxidation resistance, hot water resistance, and fuel impermeability. The electrolyte membranes are suitable for use in solid polymer fuel cells and are produced by first graft polymerizing acrylic acid derivatives or vinylketone derivatives as monomers onto polymer substrate films and by then performing selective conversion to a sulfonic acid group of hydrogen atoms on the carbon atom adjacent to the carbonyl in the ketone or carboxyl group on the graft chains. The present invention also relates to a process for producing such polymer electrolyte membranes.

2. Background Art

Solid polymer fuel cells have high energy density and hence hold promise for use as power supplies to household cogeneration systems, mobile communication devices and electric vehicles or as simplified auxiliary power sources. Such fuel cells require polymer electrolyte membranes that are long-lived and have high durability.

In solid polymer fuel cells, the electrolyte membrane not only acts as a proton conducting "electrolyte" but also has the role of a diaphragm that prevents the fuel hydrogen or methanol from directly mixing with oxygen. This electrolyte membrane must satisfy the following requirements: high enough chemical stability to withstand prolonged large current, in particular, high resistance in acidic aqueous solutions (acid resistance), high resistance against peroxide radicals (oxidation resistance), and high heat resistance in the presence of water (hot water resistance); and low electrical resistance. The membrane which also has the role of a diaphragm must satisfy other requirements including high mechanical strength and good dimensional stability, as well as low gas permeability to the fuel hydrogen gas or methanol and to oxygen gas.

Early solid polymer fuel cells employed hydrocarbon-based polymer electrolyte membranes as produced by copolymerizing styrene with divinylbenzene. However, those electrolyte membranes did not have high practical feasibility since they were very low in durability on account of poor acid and oxidation resistance; hence, they were later replaced by Nafion® and other fluorine-containing polymer electrolyte membranes. Nafion® is the fluorinated sulfonic acid polymer membrane developed by Du Pont.

The conventional fluorine-containing electrolyte membranes including Nafion® have superior chemical stability; on the other hand, their ion-exchange capacity is small, only about 0.9 meq/g, and on account of insufficient water retention, the electrolyte membrane dries and its proton conductivity is lowered, or in the case where methanol is used as fuel, the membrane will swell in alcohols or "cross-over" of methanol will deteriorate the fuel cell characteristics.

If, with a view to increasing the ion-exchange capacity, an attempt is made to introduce more sulfonic acid groups, the strength of the membrane decreases so markedly that it may break easily. Therefore, with the conventional fluorine-containing polymer electrolyte membranes, it has been necessary to reduce the amount of sulfonic acid groups to such levels that the membrane strength is retained and the only products that could be obtained had no greater ion-exchange capacity than about 0.9 meq/g.

Another problem with Nafion® and other conventional fluorine-containing polymer electrolyte membranes is that monomer synthesis is so complicated that the price of the product membrane is prohibitive and this has been a great obstacle to the effort in commercializing the solid polymer fuel cell membrane. Under the circumstances, efforts have been made to develop low-cost, yet high-performance electrolyte membranes that can be substituted for Nafion® and other conventional fluorine-containing polymer electrolyte membranes.

An attempt has been made to fabricate an electrolyte membrane for use in solid polymer fuel cells by introducing a styrene monomer into an ethylene-tetrafluoroethylene copolymer (hereinafter abbreviated as ETFE) having a hydrocarbon structure by means of a radiation-induced graft reaction and then sulfonating the introduced styrene monomer (see JP 9-102322 A). However, it has been pointed out that this approach has the disadvantage that during cell operation at elevated temperature in the presence of water, the thermal elimination due to the low hot water resistance of the sulfone groups introduced into the polystyrene or the oxidative decomposition of graft chains causes deterioration that is accompanied by a decrease in the ion-exchange capacity of the membrane (see JP 11-111310 A).

With a view to suppressing the elimination of sulfonic acid groups, an attempt has been made to introduce them not by direct coupling to the benzene ring in an aromatic hydrocarbon such as styrene but by coupling with an intervening alkylene group and it has been reported that this technique is effective to some extent (see JP 2003-100317 A). Thus, introducing sulfonic acid groups not directly into the benzene ring is held effective in improving hot water resistance and oxidation resistance.

SUMMARY OF THE INVENTION

The present invention has been accomplished under these circumstances and has as an object solving not only the problems with fluoro-resin electrolytes, i.e., low ion conductivity and fuel's crossover, but also the problems with styrene grafted electrolyte membranes which are synthesized by first introducing a styrene monomer into a polymer substrate by means of a radiation-induced graft reaction and then sulfonating the introduced styrene monomer, i.e., deterioration of the membrane due to thermal elimination of the sulfone groups and oxidative decomposition of the graft chains that occur while the fuel cell incorporating that membrane is operating at elevated temperature; to solve these problems, the present invention first introduced graft chains by graft polymerization and then sulfonated the introduced graft chains, to thereby provide a polymer electrolyte membrane having high durability over prolonged operation as exemplified by superior proton conductivity, fuel impermeability, and hot water resistance.

Thus, the first aspects of the present invention provides a polymer electrolyte membrane, especially one suitable for use in fuel cells, that has not only high ion conductivity and low fuel permeability but also superior hot water resistance and oxidation resistance.

The second aspects of the present invention also provides a process for producing this polymer electrolyte membrane.

Briefly, a base matrix comprising a fluorine-containing polymer, an olefinic polymer or an aromatic polymer that have superior mechanical characteristics and chemical stability under elevated temperature is subjected to radiation-induced graft polymerization of a monomer having an acrylic acid derivative or a vinylketone derivative as a framework and then sulfonic acid groups are primarily introduced into the graft chains in the resulting polymer, to thereby fabricate a polymer electrolyte membrane that has not only high ion conductivity and low fuel permeability but also superior hot water resistance and oxidation resistance.

The polymer electrolyte membrane of the present invention can be produced at a much lower cost than the fluororesin polymer electrolyte membranes and yet by virtue of the graft polymerization and selective sulfonation that are adopted in the process, it features not only high proton conductivity and low fuel permeability but also high resistance to oxidation and hot water and because of these characteristics, it is particularly suitable for use in household cogeneration systems that desirably have durability to prolonged use and in automotive fuel cells that are required to withstand use at elevated temperatures.

BRIEF DESCRIPTION OF THE DRAWINGS

FIG. 1 illustrates a graft chain comprising a carboxyl group, and a graft chain comprising a ketone group according to embodiments of the invention.

DETAILED DESCRIPTION OF THE INVENTION

Substrate polymers that can be used in the present invention include fluorine-containing polymers and thermoplastic resins. Specific examples of fluorine-containing polymers that can be used as substrates are polytetrafluoroethylene (hereinafter abbreviated as PTFE), tetrafluoroethylene-propylene hexafluoride copolymer (hereinafter abbreviated as FEP), tetrafluoroethylene-perfluoroalkyl vinyl ether copolymer (hereinafter abbreviated as PFA), poly(vinylidene fluoride) (hereinafter abbreviated as PVDF), ETFE, poly(vinyl fluoride) (hereinafter abbreviated as PVF), and polychlorotrifluoroethylene copolymer (hereinafter abbreviated as ECTFE). If the fluorine-containing polymers are preliminarily crosslinked, there can be obtained electrolyte membranes that have even higher heat resistance and which are even less prone to swell.

Preparation methods of crosslinked PTFE are; for example, described in JP 6-116423 A. Preparation methods of crosslinked FEP or PFA are, for example, described in JP 11-46867 A. Preparation methods of crosslinked PVDF or ETFE are, for example, described in JP 11-349711 A. Preparation methods of crosslinked PVF, PCTFE or ECTFE are, for example, described respectively in L. A. Wall and two others, Journal of Polymer Science, Part A-1, 4, 349 (1966), S. Straus and one other, S. P. E. Transactions, 4, 61 (1964), and Y. X. Luo and two others, Radiation Physics and Chemistry, 18, 445 (1981). In particular, the crosslinked PTFE can be produced by irradiating uncrosslinked PTFE with 5 kGy to 500 kGy of a radiation such as γ-rays, X-rays or electron beams at a temperature in the range of 300° C. to 365° C. in an inert gas with an oxygen partial pressure of subatmospheric $10^{-3}$ Torr to 10 Torr or $10^{-2}$ Torr to 10 Torr. Exemplary inert gases that can be used include nitrogen, argon, and helium.

Another class of substrate polymers that can be used in the present invention comprise olefinic polymers including polyethylene and polypropylene of low-density, high-density or super-high molecular weight, as well as thermoplastic resins typified by polymers prepared from monomeric trimethylpentene. If crosslinked olefinic polymers are adopted, there can be obtained electrolyte membranes that have higher heat resistance with a smaller tendency to swell and which are preferred in certain applications.

Still another class of substrate polymers that can be used in the present invention comprise thermoplastic resins that are designated engineering plastics. Specific examples include polyimides, polyamideimides, polyetherimides, poly(ethylene naphthalate), liquid-crystalline aromatic polymers, poly (ether ether ketone), polysulfones, and poly(ether sulfone).

If desired, in order to further improve the durability of the electrolyte membrane or to suppress its swelling, thermoplastic resins may be blended with a variety of inorganic fillers and the resulting composite materials may be used as the substrate polymer; alternatively, polymer alloys may be employed as the substrate polymer.

One embodiment of the present invention is characterized in that using a complex of a sulfonating agent such as sulfur trioxide or chlorosulfonic acid with a coordinating compound having unshared electron pairs as in oxygen or nitrogen (the complex is hereinafter referred to as a complexed sulfonating agent), hydrogen atoms on the carbon adjacent to, such as next to the carbonyl in ketone or a carboxyl group are selectively converted to sulfonic acid groups, whereby an alkylsulfonic acid structure that is stable at elevated temperature in the presence of an oxidant is introduced into graft chains. Therefore, the monomers that can be used in the present invention are not limited in any particular way as long as they are acrylic acid derivatives or vinyl ketone derivatives which are polymerizable vinyl compounds that have hydrogen atoms on the carbon adjacent to the carbonyl.

The acrylic acid derivatives may be exemplified by acrylic acid, its salts, and its esters. Specific examples include acrylic acid, sodium acrylate, potassium acrylate, trimethylammonium acrylate, triethylammonium acrylate, methyl acrylate, ethyl acrylate, propyl acrylate, butyl acrylate, phenyl acrylate, naphthyl acrylate, benzyl acrylate, etc.

The vinyl ketone derivatives may be exemplified by alkyl vinyl ketone, allyl vinyl ketone, and alkyl (2-propenyl)ketone. Specific examples include methyl vinyl ketone, ethyl vinyl ketone, propyl vinyl ketone, butyl vinyl ketone, phenyl vinyl ketone, benzyl vinyl ketone, methyl (2-propenyl)ketone, ethyl (2-propenyl)ketone, propyl (2-propenyl)ketone, butyl (2-propenyl)ketone, benzyl (2-propenyl)ketone, etc. These monomers may be used either alone or in admixture; if desired, they may be diluted in solvents before use.

In another embodiment of the present invention, the monomers mentioned above may be mixed with one or more hydrocarbon-based vinyl monomers and/or fluorocarbon-based vinyl monomers before graft polymerization. If more than 50 wt % of these monomers is added, the content of sulfonic acid groups is decreased to result in lower electrical conductivity.

Preferred hydrocarbon-based vinyl monomers that can be added in the present invention include but are not limited to methacrylic acid, its salts, its esters, as well as styrene, isobutene, butadiene, and acetylene derivatives.

Preferred fluorocarbon-based vinyl monomers that can be added in the present invention include but are not limited to heptafluoropropyl trifluorovinyl ether, ethyl trifluorovinyl ether, hexafluoropropene, perfluoro(propylvinyl ether), pentafluoroethyl trifluorovinyl ether, perfluoro(4-methyl-3,6-dioxanone-1-ene), trifluoromethyl trifluorovinyl ether, and hexafluoro-1,3-butadiene.

It is also possible to crosslink graft chains with at least 20 wt % of a crosslinking agent being added to the monomers. If desired, graft chains may be crosslinked after graft polymerization by reacting them with a suitable crosslinking agent such as polyfunctional monomers or triallyl isocyanurate. Specific examples of the crosslinking agent include 1,2-bis (p-vinylphenyl)ethane, divinyl sulfone, ethylene glycol divinyl ether, diethylene glycol divinyl ether, triethylene glycol divinyl ether, divinylbenzene, cyclohexane dimethanol divinyl ether, phenyl acetylene, diphenyl acetylene, 2,3-diphenyl acetylene, 1,4-diphenyl-1,3-butadiene, diallyl ether, 2,4,6-triallyloxy-1,3,5-triazine, triallyl-1,2,4-benzene tricarboxylate, triallyl-1,3,5-triazine-2,4,6-trione, etc.

The above-mentioned monomers may be graft polymerized on polymer substrates either by "pre-irradiation" where the substrate is first irradiated and then reacted with the monomer, or by "simultaneous irradiation" where the substrate and the monomer are simultaneously irradiated to graft the monomer. Pre-irradiation is preferred since it generates a smaller amount of homopolymer.

Pre-irradiation may be performed by the polymer radical method in which the polymer substrate is irradiated in an inert gas or the peroxide method in which the substrate is irradiated in the presence of oxygen. Either method may be adopted.

In the case of producing a membrane by radiation-induced graft polymerization using an acrylic acid derivative as a monomer, the temperature for graft polymerization is usually at 20 to 150° C., preferably at 20 to 80° C., to introduce polymer graft chains.

In the case of producing a membrane by radiation-induced graft polymerization using a vinyl ketone derivative as a monomer, the temperature for graft polymerization is usually at −20 to 100° C., preferably at 0 to 60° C., to introduce polymer graft chains.

The degree of polymer grafting becomes higher as the dose of pre-irradiation increases but then excessive doses will lead to deterioration of the substrate; hence, the dose of pre-irradiation is preferably 200 kGy or less, and the degree of grafting of the graft polymer obtained ranges from 5 wt % to 200 wt %, preferably from 10 wt % to 120 wt %, on the basis of the weight of polymer substrate.

The sulfonation reaction that is to be carried out with the complexed sulfonating agent in the present invention is characterized in that the coordinating compound having unshared electron pairs as in oxygen or nitrogen is coordinated to the sulfonating agent such as sulfur trioxide or chlorosulfonic acid to thereby suppress its reactivity while, at the same time, hydrogen atoms on the carbon adjacent to the carbonyl in ketone or a carboxyl group are selectively converted to sulfonic acid groups. Therefore, the sulfonating agent is not limited in any particular way as long as it forms a complex with the coordinating compound. Specific examples include sulfur trioxide and chlorosulfonic acid. Similarly, the coordinating compound is also not limited in any particular way as long as it is an organic compound having unshared electron pairs which coordinates to the sulfonating agent. Specific example include dioxane, dimethyl ether, diethyl ether, DMF, and pyridine. The coordinating compound is used in an amount of 0.1-2.0 molar equivalents per mole of the sulfonating agent. If less than 0.1 molar equivalent of the coordinating compound is used, the reactivity of the sulfonating agent is so high as to induce side reactions such as decomposition of graft chains; if more than 2.0 molar equivalents of the coordinating compound is used, the reactivity of the sulfonating agent is so low that there will be no progress of sulfonation. The solvent for the sulfonation reaction is determined from the viewpoints of swelling of the polymer substrate, the solubility of the complexed sulfonating agent and its reactivity, and chlorine-containing solvents are preferably employed. Specific examples include 1,2-dichloroethane, 1,1,2,2-tetrachloroethane, chloroform, and methylene chloride.

The graft chains into which sulfonic acid groups have been introduced can be rendered to have higher resistance to hot water and oxidation by eliminating some or all of the carboxyl group (ketone) through treatment with an alkali or hot water. For instance, a highly stable electrolyte membrane can be obtained by treatment with an aqueous solution of sodium hydroxide having a concentration of 0.05 to 3.0 molarities, preferably from 0.1 to 1.0, molarity, at a temperature within the range of 0° C. to 80° C., preferably from 30° C. to 70° C., for a period of 1-200 hours.

FIG. 1 illustrates a graft chain comprising a carboxyl group, and a graft chain comprising a ketone group according to embodiments of the invention. In the illustrated graft chain with the carboxyl group, a carboxyl group is introduced by graft polymerizing a monomeric acrylic acid derivative, and a sulfonic acid group is introduced into a carbon atom adjacent to a carbonyl in the graft chain. In the illustrated graft chain with the ketone group, a ketone group is introduced by graft polymerizing a monomeric vinylketone derivative, and a sulfonic acid group is introduced into a carbon atom adjacent to a carbonyl in the graft chain.

In order to increase the electrical conductivity of the electrolyte membrane, one may think of reducing its thickness. However, conventional electrolyte membranes will easily break if their thickness is too much reduced, so commonly employed membranes have thicknesses in the range of 30 μm to 200 μm. The electrolyte membrane for fuel cells of the present invention is useful if its thickness is within the range of 5 μm to 200 μm, preferably from 20 μm to 100 μm.

EXAMPLES

The present invention is further illustrated by the following examples and comparative examples, to which the invention is by no means limited. While various values of measurements are shown, they were determined by the following methods.

(1) Degree of Grafting (%)

The weight ratio of the portion to which a monomer was graft polymerized by radiation, as compared with the polymer substrate, is expressed as the degree of grafting $X_{ds}$ (wt %) by the following equation:

$$X_{ds}=100(W_2-W_3)/W_1$$

$W_1$: the weight (mg) of the membrane (in dry state) before grafting $W_2$: the weight (mg) of the membrane (in dry state) after grafting.

(2) Electrical Conductivity

To determine the electrical conductivity of the electrolyte membrane, its resistance ($R_m$) was measured by the AC method, with a platinum electrode being connected to HiTESTER 3522-50 (LCR meter of HIOKI E.E. CORPORATION). The electrical conductivity of the membrane was calculated by the following equation:

$$\kappa=d/(R^m \cdot S)(\Omega^{-1}cm^{-1})$$

κ: the electrical conductivity of the membrane
d: the thickness (cm) of the electrolyte membrane
S: the surface area (cm$^2$) of the electrolyte membrane.

(3) Ion-Exchange Capacity (meq/g)

The ion-exchange capacity $I_{ex}$ (meq/g) of the membrane is expressed by the following equation:

$$I_{ex}=n(\text{acid group})/W_d$$

n (acid group): the amount of acid groups (mM) in the electrolyte membrane
$W_d$: the dry weight (g) of the electrolyte membrane.

For n (acid group) measurement, the membrane was immersed in 3 M aqueous NaCl at room temperature for 24 hours until it became a —SO₃Na form and the replaced protons (H⁺) were subjected to neutralization titration with 0.1 M aqueous NaOH.

(4) Change in the Membrane's Weight

The change in the weight of the membrane $X_{su}$ as the result of sulfonation is expressed by the following equation:

$$X_{su}=100(W_3-W_2)/W_2$$

$W_2$: the weight (mg) of the membrane (in dry state) after grafting $W_3$: the weight (mg) of the membrane (in dry state) after sulfonation.

(5) Oxidation Resistance

The electrolyte membrane was immersed in a 3% aqueous hydrogen peroxide solution at 60° C. for 24 hours and the resulting change in the weight of the electrolyte membrane was measured. With the initial dry weight of the electrolyte membrane being written as $W_0$ and its dry weight after test written as $W_1$, the oxidization resistance $D_o$ of the membrane was determined by the following equation:

$$\text{Oxidation resistance } D_o = 100 W_1/W_0$$

(6) Resistance to Hot Water

The membrane was immersed in pure water at 80° C. for 200 hours and the resulting change in the electrical conductivity of the membrane was measured. With the electrical conductivity of the membrane before immersion in pure water at 80° C. being written as $\kappa_0$ and the electrical conductivity of the membrane after the lapse of 200 hours written as $\kappa_1$, the hot water resistance of the membrane $H_r$ (%) was calculated by the following equation:

$$\text{Hot water resistance } H_r = 100\kappa_1/\kappa_0.$$

Example 1

An ETFE film with a thickness of 50 μm and a size of 3 cm×2 cm was placed in a glass ampoule equipped with a cock, which was degassed and purged with argon gas at one atmosphere. Under this condition, the ETFE film was irradiated with 20 kGy of γ-rays (dose rate: 20 kGy/h) at room temperature. After the irradiation, the vessel was evacuated and charged with 20 ml of a preliminarily argon-purged 30 vol % solution of monomeric methyl acrylate (in the solvent 1-propanol) to soak the ETFE film. The interior of the vessel was displaced with argon and then closed with the cock, followed by reaction for 3 hours in a constant temperature (60° C.) water bath. After the reaction, the ETFE film was washed with toluene to remove the unreacted monomer and any resulting homopolymer; subsequent drying afforded an ETFE film with 91% grafting. This film as obtained by graft polymerization was put into a liquid mixture of 0.2 M chlorosulfonic acid diluted with 1,2-dichloroethane and 0.2 M dioxane and subjected to reaction at 60° C. for 6 hours, followed by thorough washing with water to prepare an electrolyte membrane. This membrane was measured for any weight change from sulfonation, ion-exchange capacity, oxidation resistance, and hot water resistance. The results are shown in Table 1.

Example 2

The electrolyte membrane prepared in Example 1 was soaked in 0.2 M aqueous sodium hydroxide at 60° C. for 24 hours to effect alkali treatment. Since the alkali treatment changed the ion-exchange groups in the membrane to a sodium form, the membrane was then treated with 1 M aqueous hydrochloric acid to become a proton form before it was finally washed with pure water for more than a day. This membrane was measured for any weight change from sulfonation, ion-exchange capacity, oxidation resistance, and hot water resistance. The results are shown in Table 1.

Example 3

An electrolyte membrane was prepared as in Example 1, except that the period of graft polymerization was 2 hours. The degree of grafting in this membrane was 60%. As in Example 2, the membrane was soaked in 0.2 M aqueous sodium hydroxide at 60° C. for 24 hours to effect alkali treatment and subsequently subjected to thorough washing. This membrane was measured for any weight change from sulfonation, ion-exchange capacity, oxidation resistance, and hot water resistance. The results are shown in Table 1.

Example 4

An ETFE film with a thickness of 50 μm and a size of 3 cm×2 cm was placed in a glass ampoule equipped with a cock, which was degassed and purged with argon gas at one atmosphere. Under this condition, the ETFE film was irradiated with 20 kGy of γ-rays (dose rate: 20 kGy/h) at room temperature. After the irradiation, the vessel was evacuated and charged with 20 ml of a preliminarily argon-purged solution of monomeric methyl vinyl ketone (99.5% methyl vinyl ketone) to soak the ETFE film. The interior of the vessel was displaced with argon and then closed with the cock, followed by graft reaction for 4 hours in a constant temperature (20° C.) water bath. After the reaction, the ETFE film was washed with toluene to remove the unreacted monomer and any resulting homopolymer; subsequent drying afforded an ETFE film with 40% grafting of poly(methyl vinyl ketone). This film as obtained by graft polymerization was put into a liquid mixture of 0.2 M chlorosulfonic acid diluted with 1,2-dichloroethane and 0.2 M dioxane and subjected to reaction at 60° C. for 6 hours, followed by thorough washing with water. The resulting electrolyte membrane was measured for any weight change from sulfonation, ion-exchange capacity, oxidation resistance, and hot water resistance. The results are shown in Table 1.

Comparative Example 1

The electrolyte membrane with 91% grafting as prepared in Example 1 was soaked in a solution of 0.2 M chlorosulfonic acid diluted with 1,2-dichloroethane (but containing no dioxane) and subjected to reaction at 60° C. for 6 hours, followed by thorough washing with water. The resulting electrolyte membrane was measured for any weight change from sulfonation, ion-exchange capacity, oxidation resistance, and hot water resistance. The results are shown in Table 1.

Comparative Example 2

An ETFE film with a thickness of 50 μm and a size of 3 cm×2 cm was placed in a glass ampoule equipped with a cock, which was degassed and purged with argon gas at one atmosphere. Under this condition, the ETFE film was irradiated with 15 kGy of γ-rays (dose rate: 20 kGy/h) at room temperature. After the irradiation, the vessel was evacuated and charged with 20 ml of a preliminarily argon-purged solution of styrene monomer (50 vol % solution in toluene) to soak the ETFE film. The interior of the vessel was displaced with argon and then closed with the cock, followed by reaction for 8 hours in a constant temperature (60° C.) water bath. After the reaction, the ETFE film was washed with toluene to remove the unreacted monomer and any resulting homopolymer; subsequent drying afforded an ETFE film with 35% grafting. This film as obtained by graft polymerization was put into a 0.2 M solution of chlorosulfonic acid diluted with 1,2-dichloroethane and subjected to reaction at 50° C. for 6 hours, followed by thorough washing with water. The resulting electrolyte membrane was measured for any weight change from sulfonation, ion-exchange capacity, oxidation resistance, and hot water resistance. The results are shown in Table 1.

As is clear from Table 1, compared with the electrolyte membrane of Comparative Example 2 which was prepared by radiation-induced graft polymerization of an aromatic hydrocarbon monomer such as styrene, the electrolyte membranes of Examples 1-4 that were prepared by graft polymerizing the monomeric derivatives according to the present invention were improved in resistance to hot water and oxidation resisting performance.

The electrolyte membranes of Examples 1-4 that were prepared by sulfonation with a sulfonating agent complexed with a coordinating compound (dioxane) were also improved in resistance to hot water and oxidation resisting performance than the electrolyte membrane of Comparative Example 1 which did not use dioxane; hence, the electrolyte membranes of Examples 1-4 are effective for use in fuel cells.

Among the electrolyte membranes of the present invention, those of Examples 2 and 3 which were subjected to alkali treatment had superior resistance to hot water and oxidation resisting performance over the electrolyte membranes of Examples 1 and 4 which were not subjected to alkali treatment.

The data in Table 1 thus demonstrates the outstanding effectiveness of the present invention.

TABLE 1

Characteristics of Electrolyte Membranes

|  | Ion-exchange capacity (meq/g) | Electrical conductivity (S/cm) | Weight change (%) | Oxidation resistance (%) | Hot water resistance (%) |
| --- | --- | --- | --- | --- | --- |
| Example 1 | 1.53 | 0.10 | 7.15 | 95 | 98 |
| Example 2 | 1.35 | 0.11 | 7.15 | 99 | 100 |
| Example 3 | 1.05 | 0.07 | 1.35 | 99 | 100 |
| Example 4 | 1.05 | 0.05 | 5.30 | 85 | 90 |
| Comparative Example 1 | 1.54 | 0.12 | −9.45 | 70 | 60 |
| Comparative Example 2 | 1.62 | 0.10 | 12.4 | 60 | 80 |

What is claimed is:

1. An electrolyte membrane for use in fuel cells comprising: a membrane produced by
   radiation-induced graft polymerizing a monomeric acrylic acid derivative or a monomeric vinylketone derivative on a polymer substrate to introduce graft chains comprising a ketone or carboxyl group on the polymer substrate, and
   then, introducing, using a sulfonating agent complexed with a coordinating compound, sulfonic acid groups to a carbon atom adjacent to a carbonyl in the graft chains thus introduced on the polymer substrate to form an alkylsulfonic acid structure.

2. The electrolyte membrane according to claim 1, wherein the introduction of sulfonic acid groups is followed by alkali or acid treatment to eliminate a part of the carboxylic or ketone group in the graft chains to achieve higher resistance to hot water and oxidation.

3. The electrolyte membrane according to claim 1, wherein the polymer substrate and/or the sulfonic acid group containing polymer chains that have been grafted on the substrate have a crosslinked structure.

4. A method for producing an electrolyte membrane for use in fuel cells, the method comprising:
   subjecting a base matrix comprising a fluorine-containing polymer, an olefinic polymer or an aromatic polymer to radiation-induced graft polymerization of a monomer having a monomeric acrylic acid derivative or a monomeric vinylketone derivative as a framework to introduce graft chains comprising a ketone or carboxyl group on the polymer substrate, and
   then, introducing sulfonic acid groups, using a sulfonating agent complexed with a coordinating compound, into a carbon atom adjacent to a carbonyl in the graft chains thus introduced on the polymer substrate to form an alkylsulfonic acid structure, to thereby fabricate a polymer electrolyte membrane that has not only high ion conductivity and low fuel permeability but also superior hot water resistance and oxidation resistance.

5. The method according to claim 4, wherein the coordinating compound is dioxane, dimethyl ether, diethyl ether, dimethylformamide, or pyridine.

6. The electrolyte membrane according to claim 2, wherein the polymer substrate and/or the sulfonic acid group containing polymer chains that have been grafted on the substrate have a crosslinked structure.

* * * * *

UNITED STATES PATENT AND TRADEMARK OFFICE
CERTIFICATE OF CORRECTION

PATENT NO. : 8,263,287 B2
APPLICATION NO. : 12/068665
DATED : September 11, 2012
INVENTOR(S) : Shuichi Takahashi et al.

It is certified that error appears in the above-identified patent and that said Letters Patent is hereby corrected as shown below:

Column 10, Line 17, In Claim 2, delete "carboxylic" and insert -- carboxyl --, therefor.

Signed and Sealed this
First Day of January, 2013

David J. Kappos
*Director of the United States Patent and Trademark Office*